(12) United States Patent
Repp et al.

(10) Patent No.: US 10,023,312 B2
(45) Date of Patent: Jul. 17, 2018

(54) HELICOPTER HOIST SYSTEMS, DEVICES, AND METHODOLOGIES

(71) Applicant: Breeze-Eastern Corporation, Whippany, NJ (US)

(72) Inventors: Brad Repp, Fredericksburg, VA (US); Brad Pedersen, Mountain Lakes, NJ (US); Ezra Johnson, Fredericksburg, VA (US); Chad Cariano, Richmond, VA (US); Chad Dize, Arlington, VA (US)

(73) Assignee: Breeze-Eastern LLC, Whippany, NJ (US)

(*) Notice: Subject to any disclaimer, the term of this patent is extended or adjusted under 35 U.S.C. 154(b) by 0 days.

(21) Appl. No.: 14/795,843

(22) Filed: Jul. 9, 2015

(65) Prior Publication Data
US 2016/0009393 A1    Jan. 14, 2016

Related U.S. Application Data
(60) Provisional application No. 62/023,142, filed on Jul. 10, 2014, provisional application No. 62/107,485, (Continued)

(51) Int. Cl.
*B64D 1/22* (2006.01)
*B64D 47/02* (2006.01)
(Continued)

(52) U.S. Cl.
CPC ............... *B64D 1/22* (2013.01); *B64D 47/02* (2013.01); *B66C 1/40* (2013.01); *B66D 1/60* (2013.01)

(58) Field of Classification Search
None
See application file for complete search history.

(56) References Cited

U.S. PATENT DOCUMENTS

| | | | |
|---|---|---|---|
| 3,690,602 A * | 9/1972 | Marsh | B64D 1/22 244/137.4 |
| 4,378,919 A * | 4/1983 | Smith | B64D 1/22 244/118.1 |

(Continued)

FOREIGN PATENT DOCUMENTS

| | | | |
|---|---|---|---|
| GB | 2169572 | * | 7/1986 |
| WO | 2010010420 A1 | | 1/2010 |
| WO | WO 2010/010420 | * | 1/2010 |

OTHER PUBLICATIONS

International Search Report and Written Opinion for Application No. PCT/US2015/039825, dated Nov. 13, 2015, 12 pages.

(Continued)

*Primary Examiner* — John Olszewski
*Assistant Examiner* — Navid Ziaeianmehdizadeh
(74) *Attorney, Agent, or Firm* — Baker & Hostetler LLP

(57) ABSTRACT

A helicopter-hoist system is described. The system may include: hoist equipment, illumination systems, range-measuring equipment, camera(s), communication systems, display devices, processing/control systems including image-processing systems, and power-management systems. The system may also include a smart-hook for measuring a load on the hook. Based on the measured load on the cable, the lighting may be illuminated in different manners. In another aspect, the system may communicate with display devices, which render images of a mission to helicopter crew members or other observers. Measured parameters appurtenant to the mission—such as the weight of the load, height of the smart-hook above a surface, altitude of the aircraft, distance between the aircraft and end of the hook, location of the hook in three-dimensional space, forces on the hook and cable, and other mission-critical information—may be over- (Continued)

laid, or rendered proximate to the real images to provide crew members with a full understanding of a mission.

20 Claims, 8 Drawing Sheets

Related U.S. Application Data filed on Jan. 25, 2015, provisional application No. 62/107,558, filed on Jan. 26, 2015, provisional application No. 62/121,263, filed on Feb. 26, 2015.

(51) Int. Cl.
*B66D 1/60* (2006.01)
*B66C 1/40* (2006.01)

(56) References Cited

U.S. PATENT DOCUMENTS

| | | | |
|---|---|---|---|
| 5,088,037 A | 2/1992 | Battaglia | |
| 5,486,821 A * | 1/1996 | Stevens | G01C 15/14 340/970 |
| 5,593,113 A * | 1/1997 | Cox | B64D 1/08 177/245 |
| 5,836,548 A | 11/1998 | Dietz et al. | |
| 5,868,357 A * | 2/1999 | Gabriel | B64D 1/22 244/137.1 |
| 7,852,236 B2 | 12/2010 | Feyereisen | |
| 7,898,435 B2 | 3/2011 | Rogers | |
| 8,532,846 B2 | 9/2013 | Tollenaere et al. | |
| 9,158,306 B2 | 10/2015 | Ehlin | |
| 9,223,008 B1 * | 12/2015 | Hartman | G01S 5/163 |
| 9,441,972 B2 | 9/2016 | Belanger | |
| 9,719,800 B2 | 8/2017 | Boria | |
| 9,734,727 B2 | 8/2017 | Songa | |
| 2002/0020783 A1 | 2/2002 | Landry | |
| 2005/0237226 A1 | 10/2005 | Judge | |
| 2007/0200032 A1 | 8/2007 | Eadie | |
| 2009/0138138 A1 | 5/2009 | Ferren | |
| 2009/0295602 A1 | 12/2009 | Andrei Cemasov | |
| 2010/0073198 A1 | 3/2010 | Wegner | |
| 2010/0182340 A1 | 7/2010 | Bachelder | |
| 2010/0222993 A1 | 9/2010 | Brainard | |
| 2010/0245387 A1 | 9/2010 | Bachelder | |
| 2011/0001437 A1 * | 1/2011 | Marcaccio | F21V 33/0064 315/294 |
| 2011/0079678 A1 * | 4/2011 | Brenner | B64C 27/001 244/17.13 |
| 2011/0137497 A1 | 6/2011 | Jimenez | |
| 2011/0187548 A1 | 8/2011 | Maynard | |
| 2011/0192932 A1 * | 8/2011 | Brenner | B64D 1/22 244/17.13 |
| 2011/0200974 A1 | 8/2011 | Alois Gluck | |
| 2012/0145832 A1 | 6/2012 | Schuster | |
| 2013/0008998 A1 | 1/2013 | Morris et al. | |
| 2013/0054054 A1 * | 2/2013 | Tollenaere | G05D 1/0858 701/3 |
| 2014/0081484 A1 | 3/2014 | Covington | |
| 2014/0207315 A1 | 7/2014 | He | |
| 2014/0267723 A1 | 9/2014 | Davidson, Jr. | |
| 2015/0151851 A1 | 6/2015 | Lin | |
| 2015/0381927 A1 | 12/2015 | Mourning | |
| 2016/0048131 A1 | 2/2016 | Lesperance | |
| 2016/0133138 A1 | 5/2016 | Oldach | |
| 2016/0376028 A1 * | 12/2016 | Kube | B64C 27/04 315/77 |

OTHER PUBLICATIONS

Partial Supplementary European Search Report for Application No. 15818974.6 dated Mar. 21, 2018. 14 pages.

* cited by examiner

HELICOPTER HOIST SYSTEMS, DEVICES, AND METHODOLOGIES

RELATED APPLICATIONS

This application claims the benefit of U.S. Provisional Application No. 62/023,142, filed Jul. 10, 2014; U.S. Provisional Application No. 62/107,485, filed Jan. 25, 2015; U.S. Provisional Application No. 62/107,558, filed Jan. 26, 2015; and U.S. Provisional Application No. 62/121,263, filed Feb. 26, 2015. All of these applications are hereby incorporated by reference.

COPYRIGHT NOTICE

A portion of the disclosure of this patent document contains material to which a claim for copyright is made. The copyright owner has no objection to the facsimile reproduction by anyone of the patent document or the patent disclosure, as it appears in the U.S. Patent and Trademark Office patent file or records, but reserves all other copyright rights whatsoever.

BACKGROUND

Helicopter-hoist equipment today typically includes a lifting device such as a hoist, which is attached to the helicopter, a hoist cable, and a hook located at the distal end of the cable for direct or indirect attachment to a person, animal, or object for rescue. The hoist usually has a rotary drum for winding in and out the cable that serves to lift or transport the load. A crew member in the helicopter usually controls the raising and lowering of the hook.

Various types of hoist-rescue systems for helicopters have been developed since the 1950s. While most hoist-rescue systems are electro-mechanical in nature they generally lack positional sensors and information intelligence. This creates challenges for the pilot of the helicopter and rescue crew. For instance, when the hook end of a cable is lowered from a helicopter in bad weather, at night, in dust or smoke, and in combat missions, it is often difficult to see the hook in relation to the person or object being rescued. There is also no way for the flight crews (i.e., pilot, copilot, hoist operator, crew chief, and other observers) to all understand the complete situation of the rescue, victims, and helicopter.

Other considerations include a lack of real-time information to the rescue crew about the weight and stresses being exerted on the hoist-rescue system during a rescue, and the position of the hook relative to the ground. This can create unsafe conditions for both the rescue crew, and target during a rescue mission.

And because there is little information about the physical loads and stresses placed on the hoist-rescue system during a mission, personnel responsible for maintaining the rescue equipment often have little direct insight into the condition of the equipment as a result of any given rescue mission. Consequently, maintenance personnel must periodically perform time consuming and costly inspections of the rescue equipment to check for possible damage. Further, maintenance of rescue equipment is typically performed at periodic intervals rather than tied to a particular rescue mission in which the equipment may have been overstressed or damaged.

Also flight crews are often unable to fully and reliably debrief and review the events of a flight mission, because they are forced to work off memory after the flight mission and because they lack quantitative information related to the rescue operation that would be valuable to maintenance personnel.

SUMMARY

This Summary is provided to introduce a selection of concepts in a simplified form that are further described below. This Summary is not necessarily intended to identify key features or essential features of the claimed subject matter, nor is it necessarily intended to be used as an aid in determining the scope of the claimed subject matter.

Reference herein to an "aspect," "example," "embodiments" or similar formulations means that a particular feature, structure, operation or characteristic described in connection with the "aspect," "example," "embodiments, is included in at least one implementation in this description. Thus, the appearance of such phrases or formulations is this application may not necessarily all refer to the same example. Further, various particular features, structures, operations, or characteristics may be combined in any suitable manner in or more examples.

In one example, a helicopter-hoist system is described. The example system may include: hoist equipment (such as a motor, cable, and smart-hook (to be described)), illumination systems, range-measuring equipment, camera(s), communication systems, processing/control systems including image-processing systems, and power-savings-management systems. The aforementioned equipment may be fully integrated in a compact housing unit referred to as a cowling. In one example, the cowling is aerodynamically shaped (cylindrical or torpedo shaped with conical ends). As appreciated by those skilled in the art, the cowling may be implemented in a variety of different shapes and sizes.

In one aspect, the system may communicate with one or more display devices external to the cowling, which display real-time images of a mission to helicopter crew members or other observers. As appreciated by those skilled in the art, the images may also be recorded for post-mission display and review. Measured parameters appurtenant to the mission—such as the weight of the load, height of the smart hook above the ground or water, altitude of the aircraft, distance between the aircraft and end of the hook, location of the hook in three-dimensional space, forces on the hook and cable, and other mission-critical information—may be overlaid, or rendered proximate to the real images on the display to provide crew members with a full understanding of a mission. As a result, pilots can focus on flying with less guess work about what is happening below the aircraft. Cockpit-crew members may view the status of rescuers and victims. Hoist operator actions (such as moving the cable up or down) are visible to all crew members.

In another aspect of the system, a smart hook may be used. The smart hook is located at the rescue end of the hoist cable. The smart hook may include processing capability, lighting, measuring devices, communication devices, camera(s), and other devices. The smart hook may communicate and operate independently and/or in conjunction with processing capability contained with the cowling or elsewhere.

In one aspect, the smart-hook includes a housing interposed between a hoist-cable end, and a hook end. The housing includes lighting. A control system associated with the rescue system measures a load between the hook end and the cable end, and/or an altitude of the assembly above the ground or water. Other parameters may be measured, such as the time, position, and location of the hook and temperature surrounding the hook. Based on the measured load on the cable, altitude of the housing relative to the ground, and/or direction of motion of the housing, the lighting may be illuminated in different manners. For instance, the lighting may emit different colors relative to the load or height. In another example, the lighting may emit different patterns or frequencies dependent upon the measured load or height. The way in which the lighting is illuminated is configurable. In one aspect, the lighting associated with the smart-hook apparatus identifies a position of the hook under low light conditions, and/or signals any number of events through color and/or intensity changes of the lighting.

In another aspect, helicopter-hoist information is displayed on a display device. The altitude of the helicopter relative to ground or water directly under the helicopter is measured. The height of a rescue hook above the ground or water may as well as the load on the rescue cable may also be measured. A streaming video is received of a target rescue area including the rescue cable and the rescue hook. A first virtual marker indicating the height of a rescue hook above the ground or water is overlaid on the video stream in proximity to the hook end. A second virtual marker indicating the height of the helicopter relative to ground or water is overlaid on the video stream in proximity to helicopter. A third virtual marker on the video stream is overlaid in proximity to the cable indicating the load on the cable. The received video stream is combined with the overlaid first, second and third virtual markers and displayed in real-time.

In another aspect, measured parameters—such as maximum load, load duration, forces and angles by the cable, spinning/rotation (i.e., number of revolutions) of the hook relative to the helicopter, number of missions—may be recorded and processed to monitor and help maintain fail-safe operation of the rescue system.

BRIEF DESCRIPTION OF THE DRAWINGS

The detailed description is described with reference to the accompanying figures, wherein like reference numbers designated like or corresponding components or operations throughout the several views. The figures are not necessarily drawn to scale.

DETAILED DESCRIPTION

Example Helicopter-Hoist System for Rescue or Cargo Applications

Figure 1:
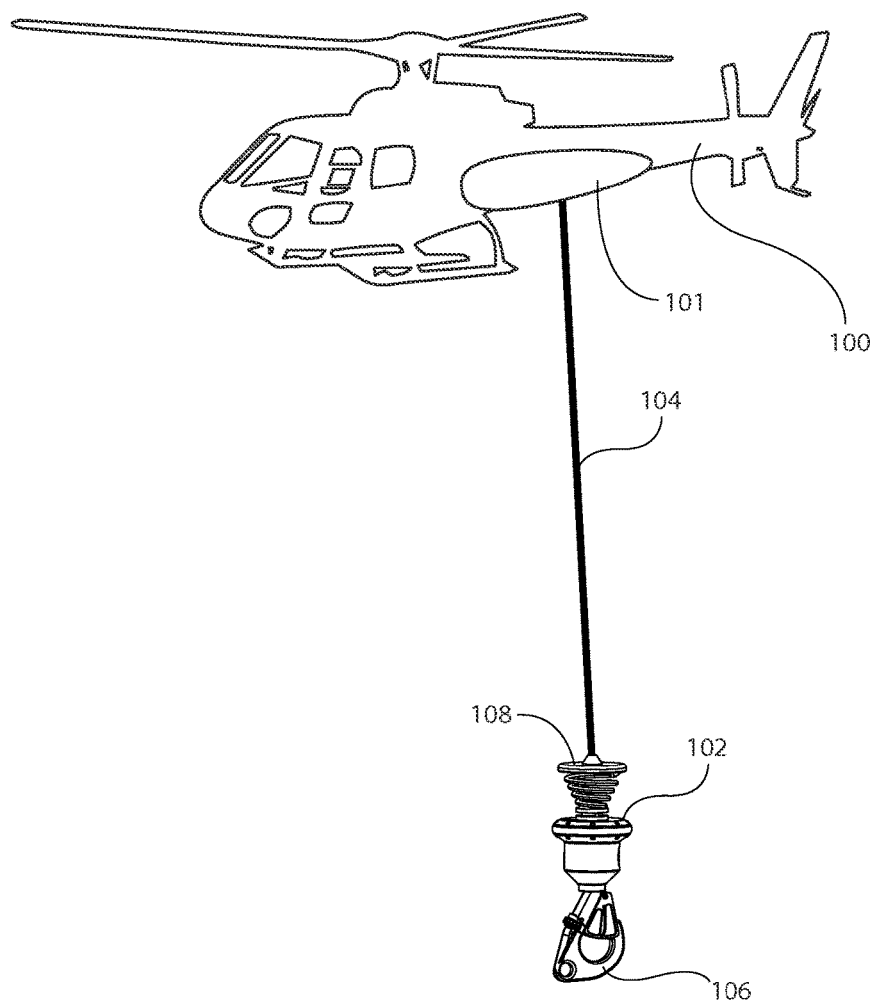
FIG. 1 shows a helicopter with an example helicopter-hoist system.

FIG. 1 shows a helicopter 100 with an example helicopter-hoist system 101, which may be used for search and rescue missions. As shown in FIG. 1, helicopter-hoist system 101 is typically positioned on the upper side of the aircraft, and may be attached directly or indirectly to helicopter 100.

Although FIG. 1 depicts a rescue helicopter as the sample aircraft, system 101 and its associated principles/methodologies described herein, are not limited to rescue helicopters, and may be applied to any airborne platform capable of hovering. For example, helicopter-hoist system 101 may be attached directly or indirectly to a cargo helicopter (not shown), such as mounted underneath an aircraft's fuselage. System 101 may also be coupled to an autonomous or remote controlled aircraft, such as an unmanned aerial vehicle, and unmanned aircraft system (UAV/UAS).

Referring to FIG. 1, system 101 includes a smart-hook 102 (to be described in more detail), and cable 104. Smart-hook 102 is positioned between a cable 104 and hook 106. That is, smart-hook 102 is connected to cable 104 at its upper end, and connected to a hook 106 (or other rescue object) on its lower end. As appreciated by one skilled in the art with the benefit of this disclosure, smart-hook 102 may be connected directly or indirectly to cable 104 and hook 106. For instance, as shown in FIG. 1, a spring-interface device 108 is connected between cable 104 and smart-hook 102.

Figure 2:
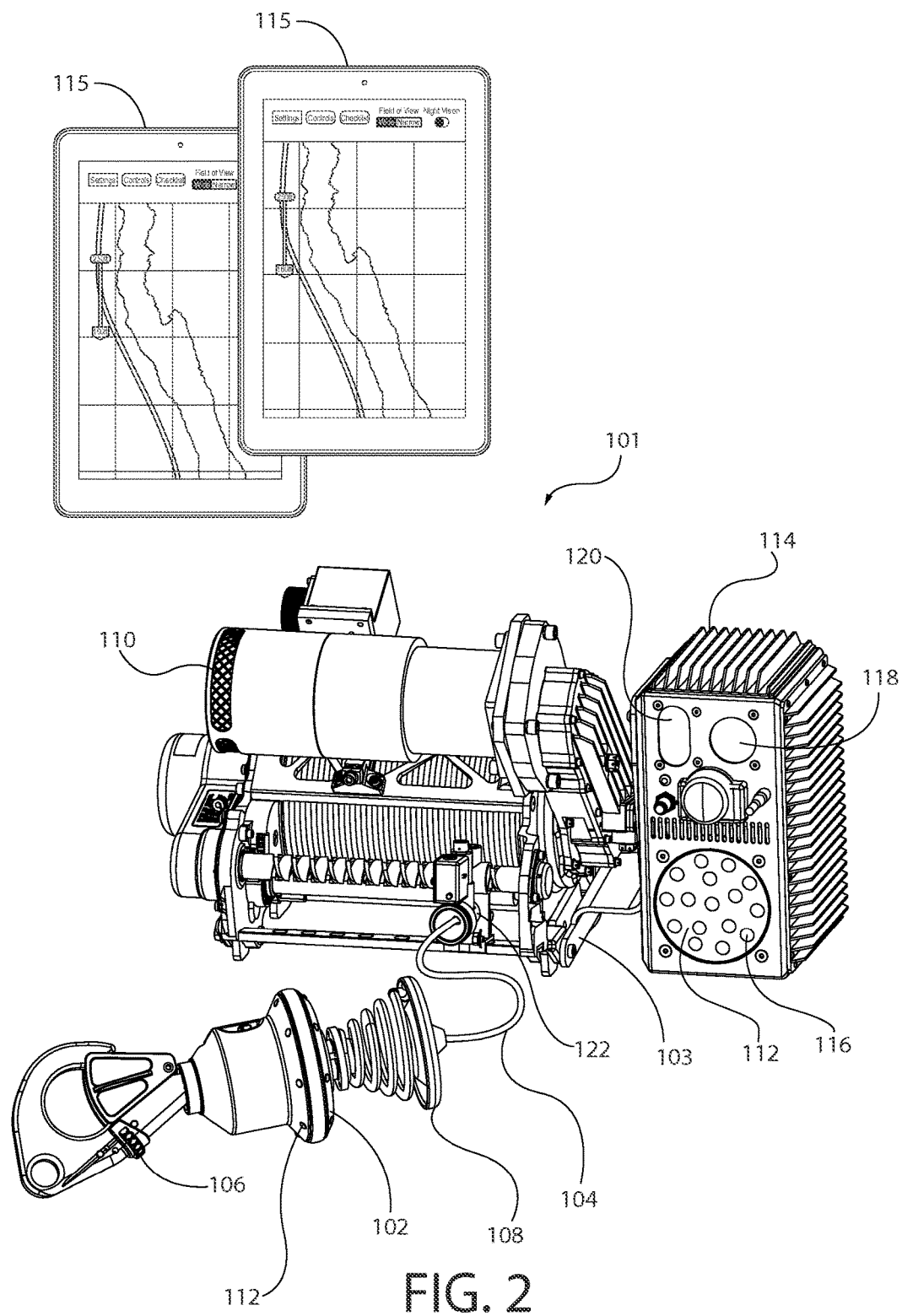
FIG. 2 illustrates an independent and enlarged view of helicopter-hoist system shown in FIG. 1.

FIG. 2 illustrates an enlarged view of helicopter-hoist system 101 shown in FIG. 1, with cable 104 in a generally retracted position. System 101 includes a frame 103 on which the hoist equipment (i.e., cable 104, smart-hook 102, and a motor 110), and an electronic housing 114 are mounted. Electronic housing 114 includes lighting, lasers, cameras, communication equipment, electronics and processing equipment to be described.

Turning first to system's hoist equipment, system 101 may include a motor 110. In one example, motor 110 may be a brushless motor, which may provide smoother raising and lowering of cable 104. In another aspect, motor 110 may include a high-performance variable-speed brushless permanent magnet rotary servomotor, with Universal AC or DC power input. Torque output may range between 5.6 Nm and 13.9 Nm. As appreciated by those skilled in the art, the exact torque range may vary and may be less than or more than 5.6 Nm and 13.9 Nm. In addition, any suitable motor or motors may be used as part of the hoist equipment.

Turning next to system's 101 electronics, system 101 may include illumination systems. In one aspect, illumination systems 112 are located on both smart-hook 102 and electronic housing 114. Illumination system 112 resident on housing 114 includes high-intensity lighting 116, such as LED spotlights, for illuminating cable 104 and smart-hook 102 and rescue scene or cargo area, thereby improving the safety and efficiency of a rescue mission or cargo operation High-intensity lighting 116 may include spot-light on-off capability, and adjustable illumination intensity. In another example, lighting 116 (or other lighting attached to system 101) may include infrared LED lights for covert illumination of a target rescue or cargo area.

System 101 may also include a camera(s) 118 for recording a scene (such as cargo or rescue target area) during the day or at night. Camera(s) 118 may include camera-stabilization technology. Although shown as part of housing 114 in FIG. 2, camera(s) 118 may be mounted inside or outside the helicopter to record a target area underneath the helicopter, such as a hook location or a target rescue area. Camera(s) 118 generate real-time-streaming video feeds that are relayed to a control system (to be described below). For instance, the video may include pictures of the cable, the rescue hook, and the rescue scene or cargo area below the hook and cable.

In addition, any number of displays 115 may also be associated with rescue system 101. These displays 115 may include, computers, laptops, tablets, handheld smart phones, monitors, permanently mounted cockpit displays such as multi-function displays (MFDs), head-up displays in helmets and other display devices as would be appreciated by those skilled in the art. As will be explained, example display devices 115 may include a real-video images with overlaid virtual indicia in the display region.

System 101 may also include range-measuring equipment (such as a laser-range finder) 120 for determining the distance of hook 102 from helicopter 100, and as well as the distance of objects or ground/water from helicopter 100.

System 101 may also include, a cable-payout and direction detector 122, which measures the distance cable 104 is extended and a direction cable 104 is moving (i.e., up or down).

Housing 114 also may include a host of other electronic equipment, which are not shown in FIG. 2, but are described in more detail below including communication systems, antenna, processing/control systems including image-processing systems, and power-management systems.

Example Cowling

Figure 3:
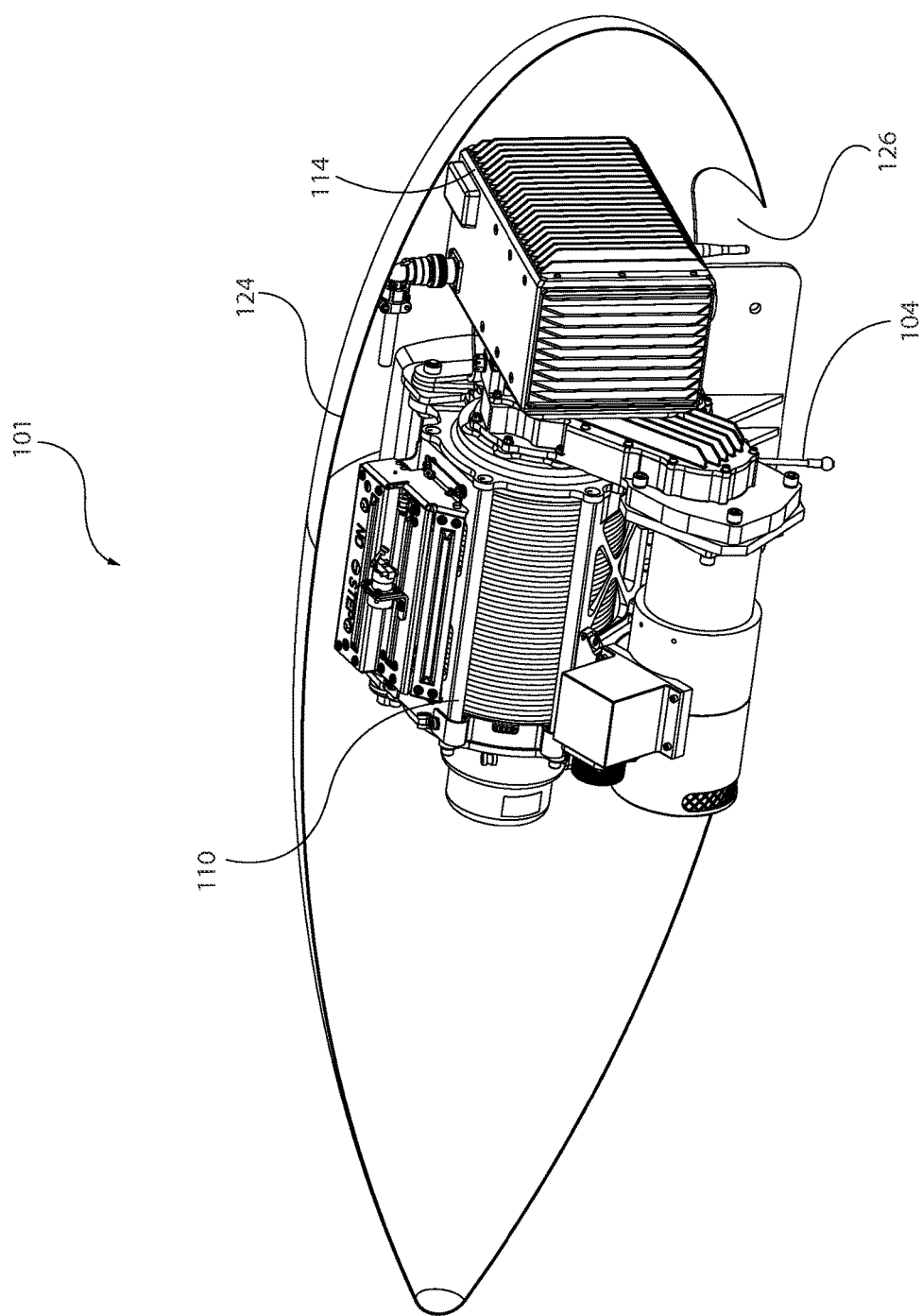
FIG. 3 depicts a transparent view of helicopter-hoist system (shown in FIGS. 1 and 2) mounted and encased within a cowling.

System 101 may be mounted and fully integrated in a cowling. For instance, FIG. 3 depicts a transparent view of helicopter-hoist system (shown in FIGS. 1 and 2) mounted and encased in a cowling 124. In one example, cowling 124 is aerodynamically shaped (cylindrical or torpedo shaped with conical ends), and is comprised of any suitable water resistant material, such as but not limited to plastic, metal, aluminum, carbon fiber, polycarbonate, and any combination of the foregoing. Cowling 124 may be configured of other suitable shapes, colors, and sizes. In addition, although hoist and electronic equipment are housed as integrated unit in cowling 124, it is possible that these units may be apart and in positioned in different areas of a helicopter.

Cowling 124 may be mounted inside or outside a helicopter. For example, cowling 124 may be mounted directly or indirectly to the fuselage of helicopter 100. Cowling 124 may have openings 126 to allow ingress and egress of cable 104, as well as the ability to transmit and receive light and images via optical systems (i.e., lasers, cameras, lights, etc.) resident on housing 114.

Example Smart-Hook Apparatus

Figure 4:
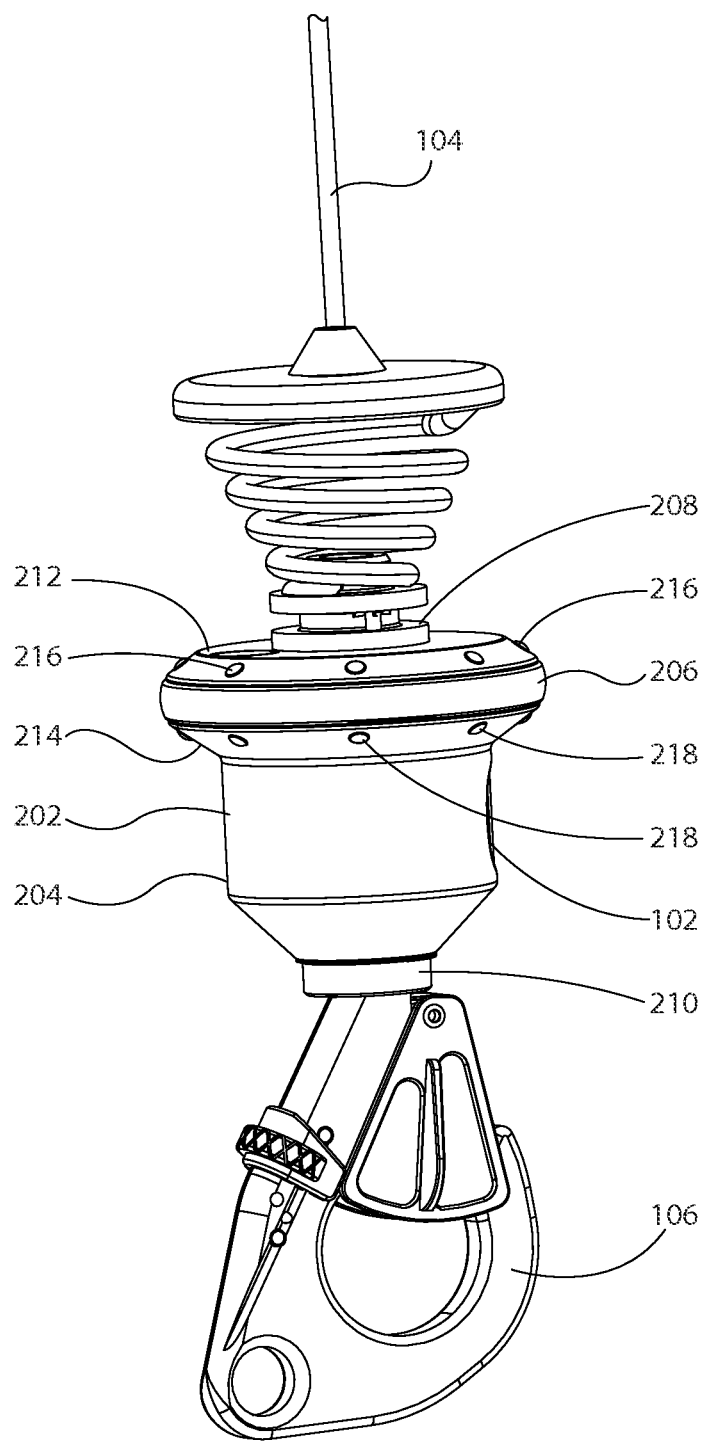
FIG. 4 shows a further enlarged view of the smart-hook apparatus depicted in FIG. 2.

FIG. 4 shows a further enlarged view of smart-hook 102 of system 101 shown in FIGS. 1 and 2. Smart-hook 102 includes a housing 202 with an outer surface 204. Outer surface 204 may be comprised of any suitable waterproof material, such as aluminum, plastic, fiberglass, or polycarbonate. Further, outer surface 204 may be configured into any suitable shape and color(s). In addition, housing 202 may be submersible in water, and may descend over 20 feet under water.

For instance, in one example, the shape of outer surface 204 includes a ring 206 coaxially protruding from housing 202. As shown in FIG. 4, ring 206 is located between cable end 208 and the hook end 210 of housing 202. In this example, ring has an upper surface 212 generally facing cable 208, and a lower surface 214 facing the hook end 210. The position of ring 206 may vary. In addition, as appreciated by those skilled in the art with the benefit of this disclosure, ring 206 may be of different shapes, configurations, and dimensions, and is not limited to cylindrical shapes.

A first plurality of lights 216 are mounted on upper surface 212 of the ring 206 configured to generally illuminate light upward and toward a helicopter when hook 106 is lowered from a helicopter. Alternatively, in another example, a single set of lights may be mounted at the edge of ring 206, so they can be seen from both below and above ring 206.

A second plurality of lights 218 are mounted on lower surface 214 of ring 206 configured to illuminate light downward and generally in a direction away from a helicopter when the hook end 210 is lowered from a helicopter (such as helicopter 100 FIG. 1). Thus, lights 216, 218 are visible from the side, above and/or below smart-hook 102.

Lights 216, 218 may be light emitting diodes (LEDs) and/or or other types of lights (including lasers) as would be appreciated by one of skilled in the art. Lights 216, 218 may include white lighting, and colored lights (such as green, red, yellow or other suitable colors). Lights 216, 218 may also include stealth-lighting capability such as infrared lights. For example, lights 216, 218 may be compatible with night-vision goggles (NVG) or other night vision systems, but generally be undetectable to the unaided-human eye.

Figure 5:
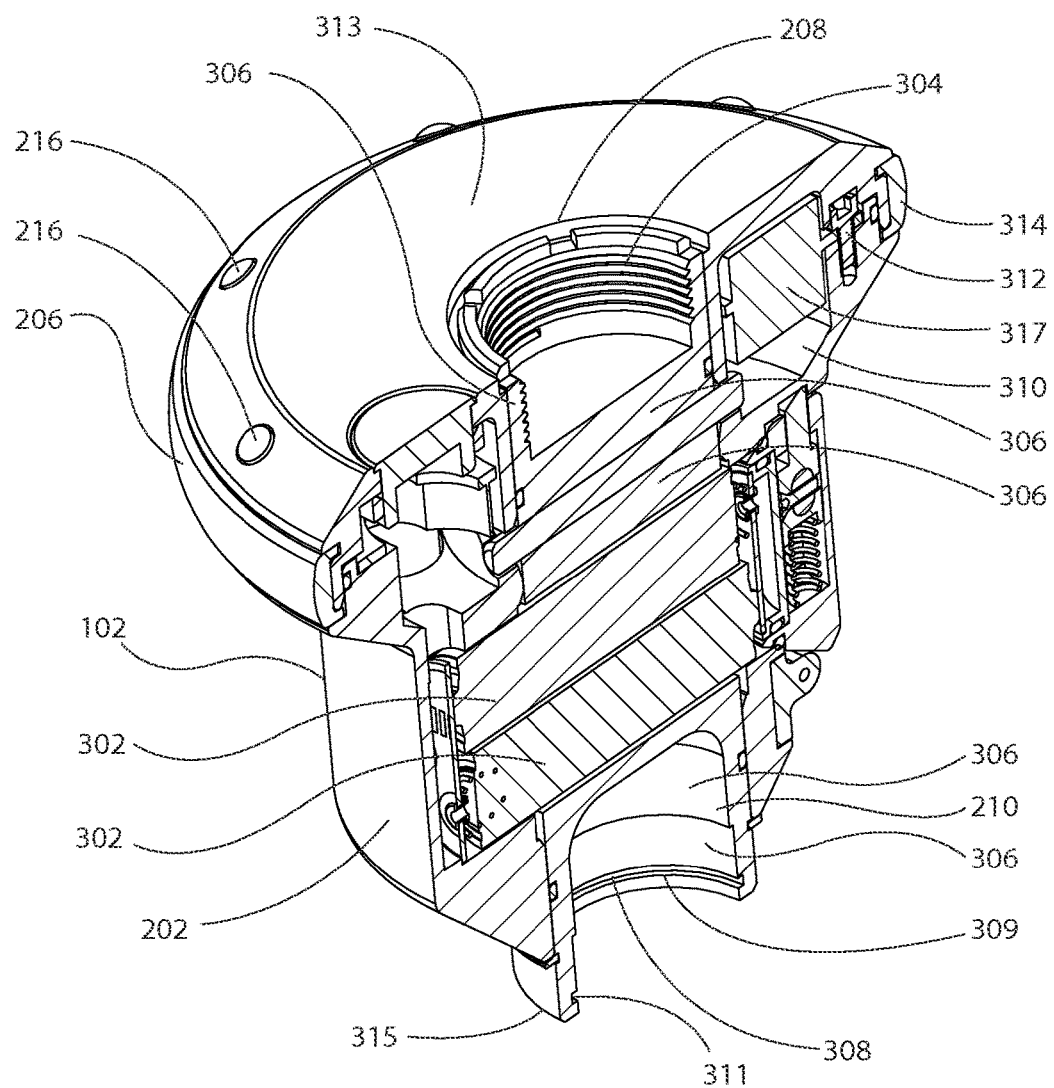
FIG. 5 shows a cross sectional view the smart-hook apparatus shown in FIGS. 1 and 2.

FIG. 5 shows a cross sectional view of example smart-hook 102 shown in FIGS. 1, 2, and 4. As shown in FIG. 5, inside of smart-hook 102 is a battery compartment 302 configured to receive any suitably-sized batteries (not shown) in parallel. Generally, battery compartment is encased and sealed to withstand water. Battery compartment serves as a power source for a control system (to be described) in smart-hook 102.

In another example, smart-hook may be powered through energy harvesting upon decent and retraction (upward or downward motion) and/or to power the control system via transfer of electrical power via a conductive wire along cable 104.

In the example smart-hook 102 shown in FIG. 5, cable end 208 includes a threaded connector 304 for coupling smart-hook 102 directly or indirectly to a hoist cable. Although shown as a threaded connector 304, other connector technology may be used such as a snap-in connector.

Hook end 210 includes a hook interface component 308, which includes a mounting feature 309 for a bearing along with a groove 311 for a spring-loaded retainer ring. These features allow for complementary features attachment features of the hook (not shown) to be positively and securely retained/engaged in smart-hook 102 while allowing for the hook to rotate (i.e., spin) freely relative to the load cell described below.

A load cell 306 is integrated in smart-hook 102. Load cell 306 in the example depicted in FIG. 5 is configured as a single member extending from a top 313 to a bottom 315 of smart-hook 302. (Note that some structure of the load cell in FIG. 5 is actually behind battery compartment 302). Load cell 306 measures the load. That is, load cell 306 is positioned in a load path between the hook and cable. In this example, load cell 306 provides a single-structural member that connects to the cable on top 313 and the hook on the bottom 315

As appreciated by one skilled in the art after having the benefit of this disclosure, load cell 306 can have any construction and be positioned in smart-hook 102 or along cable 104 (FIG. 1) path in any suitable manner to acquire load data.

Also contained within smart-hook 102 is a smart-hook-control system 310 (partially shown in FIG. 5). Smart-hook-control system 310 may be configured to measure and transmit the load on the hook, altitude of the assembly above ground or water, position and/or directionality of the assembly, and/or other information. All load and sensor data may be stored in any suitable-memory-storage device 317 within smart-hook 102 for post-mission downloading and review. Alternatively, an antenna 312 serves as a means for communicating wirelessly between smart-hook-control system 310 and other systems located in helicopter 100 or elsewhere. A data port 314 may also serve as a means for communicating with other computing devices including memory storage devices.

Example Control and Interoperability for Hoist System

Figure 6:
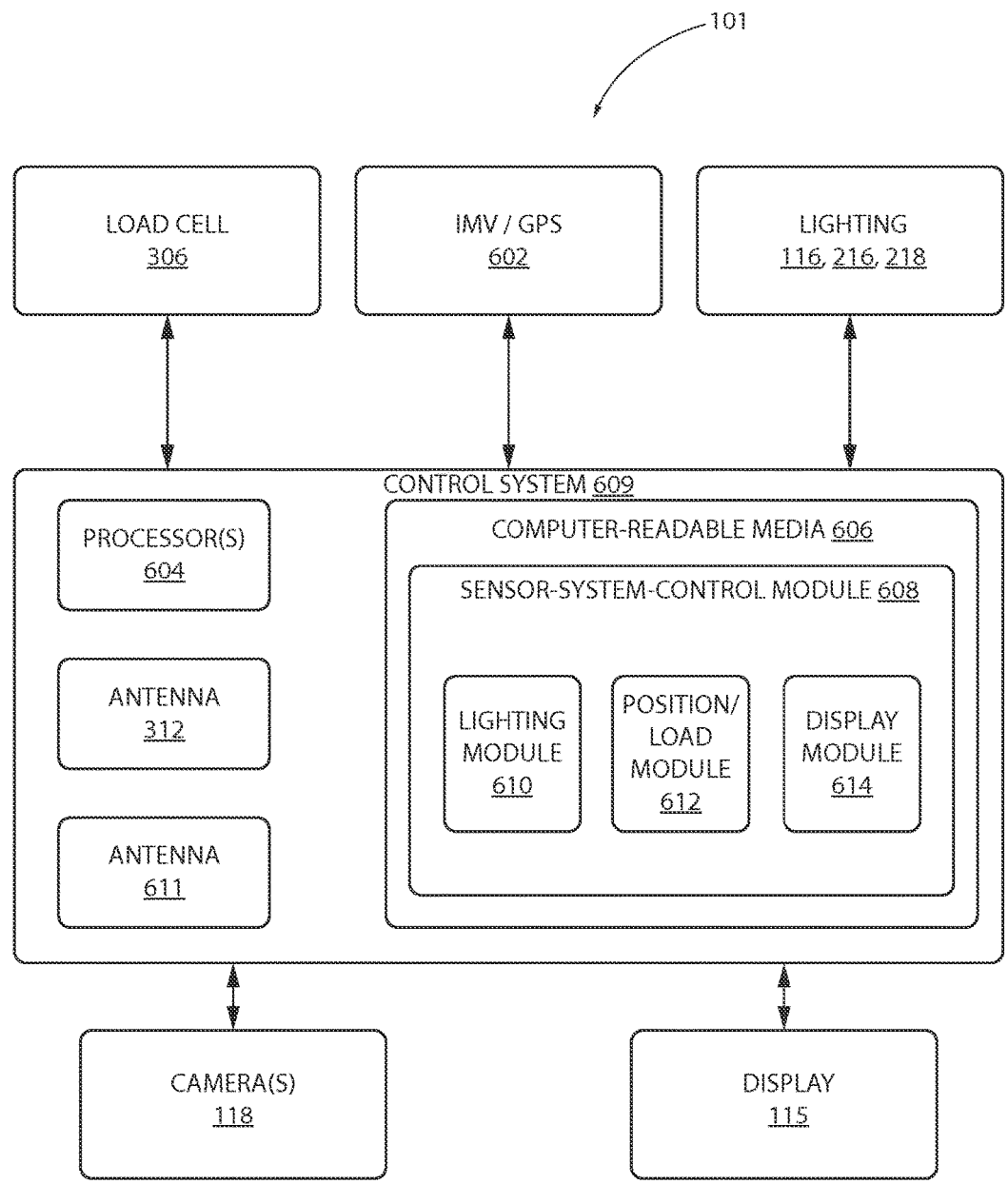
FIG. 6 is a block diagram illustrating select components of an example helicopter-hoist system that facilitate its interoperability.

FIG. 6 is a block diagram illustrating select components of an example helicopter-hoist system 101 that facilitate the interoperability of system 101. As shown in FIG. 6, system 101 includes an example control system 609 (FIGS. 5 and 6), which controls and monitors smart-hook 102 and other systems/devices associated with system 101 as described in this document.

Although control system 609 is illustrated as a discrete block, it is appreciated by those skilled in the art with the benefit of this disclosure, that control system 609 may reside at various times across different components of system 101. For instance, control system 609 may be implemented and reside as a component of smart-hook 102 (such as smart-hook-control system 306 (FIG. 5)), and may be also be implemented and reside in housing 114, and/or across other devices remote from smart-hook 102 and housing 114.

Thus, in a general sense, those skilled in the art will recognize that the various control systems described in system 101 (cowling 124 and smart hook 102) can be implemented individually or collectively by a wide range of electrical, mechanical, optical, processing (including hardware, software, firmware, and/or virtually any combination thereof), and various combinations of the foregoing.

Furthermore, various elements located in smart hook 102 (FIGS. 1, 2, 5) may communicate via antenna 312 in smart hook 102 (FIG. 5) with components resident in housing 114 or other component remote from housing 114, such as located in helicopter 100. An antenna 611 (FIG. 6) located in cowling 124 may provide a mechanism for transmitting and receiving data to/from smart hook 102, and for communicating with display devices 115, and other devices. Thus, even though smart-hook-control system 310 (FIG. 5) is shown apart from control system 609 (FIG. 6), it is appreciated by those skilled in the art with the benefit of this disclosure that smart-hook-control system 310 (FIG. 5) may form an integral part of the overall control system 609 (FIG. 6) for system 101. In addition, although wireless communication via antennae 312/611 is shown in FIGS. 5 and 6, it is appreciated that wired communication may be used between smart-hook 102 and other elements of system 101.

As depicted in FIG. 6, control system 609 represents any suitable computer device(s) having one or more processor(s) 604 and the ability to access computer-readable media 606 to execute instructions or code that controls smart-hook 102, as well as other devices associated with system 101. Processors 604 may be located in housing 114 (FIGS. 2 and 3) may be embodied as any suitable electrical circuit, computing processor including special integrated circuits, ASICs, FPGAs, microcontrollers, processor, co-processor, controllers, or other processing means. Processors 604 may also be embedded in smart-hook 102.

Processor(s) may be distributed in more than one computer system and over a network (not shown). Examples of computer systems may include, but are not limited to, a server, personal computer, distributed computer systems, or other computing devices having access to processors and computer-readable medial. Further, although not shown, any number of system busses, communication and peripheral interfaces, input/output devices, and other devices may be included in control system 609 (including smart-hook-control system 310), as appreciated by those skilled in the art.

Still referring to FIG. 6, computer-readable media 606 may include any suitable computer-storage media including volatile and non-volatile memory, and any combination thereof. For example, computer storage media includes volatile and non-volatile, removable and non-removable media implemented in any method or technology for storage of information such as computer readable instructions, data structures, program modules, or other data. Computer storage media may further include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory or non-transmission medium that can be used to store information for access by a computing device.

In other examples, the computer-readable media 606 may include communication media that may embody computer readable instructions, data structures, program modules, or other data in a modulated data signal, such as a carrier wave, or other transmission mechanism. As defined herein, computer-storage media does not include communication media.

Further, computer-readable media 606 may be local and/or offsite to computer systems (not shown). For instance, one or more portions of, or all of data or code stored in computer-readable media 606, may be accessed from a computer-storage medium local to and/or remote to control system 609, such as from a storage medium connected to a network.

Resident in computer-readable media 606 may be one or more operating systems (not shown), and any number of other program applications or modules in the form of computer-executable instructions and/or logic which are executed on processor(s) 604 to enable processing of data or other functionality.

Example Sensor-System-Control Module

Still referring to FIG. 6, control system 609 is configured with a sensor-system-control module 608 maintained in computer-readable media 606. In one example, sensor-system-control module 608 may be implemented as code in the form of computer-readable instructions that execute on one or more processors 604. For purposes of illustration, programs and other executable-program modules are illustrated herein as discrete blocks, although it is recognized that such programs and components may reside at various times in different storage components. Further, such code may be implemented as one or more applications or modules, or may be integrated as components within a single application. Such code stored in computer-readable media 606 may be implemented across one or more computers in a cloud computing environment, on a local device or system, or on a combination of both. The following discussion does not limit the implementation of code stored in computer-readable media 606 to any particular device or environment.

Sensor-system-control module 608 may include components contained in computer-readable media 606. In one example, sensor-system-control module 408 includes: a lighting module 610, a position/load module 612, and a display module 614.

Example lighting module 610 facilitates a mode of operation of control system 609, which controls lights 112 (FIG. 2) and/or 216/218 (FIG. 2, 4, 5, 6). This may include an illumination pattern, flash frequency, brightness, and/or color emitted from lights 116 (FIG. 2) and/or lights 216/218 (FIG. 2, 4, 5, 6). Control system 609 (including smart-hook-control system 310) is further configured to control the illumination pattern, flash frequency, and color emitted from the plurality of lights 112 (FIG. 2), and/or lights 216/218 (FIG. 2, 4, 5, 6) based on the measured load between the hook end and the cable end and/or the measured altitude of smart-hook 102 relative to the ground or water. Lights may also be controlled in other manners.

For instance, lighting module 610 may enable control system 609 to cause lights 112 (FIG. 2) and/or lights 216/218 (FIG. 2, 4, 5, 6) to flash, change colors, or change intensity based upon hook load, hook height above the ground/water, hook distance from the helicopter or other desired parameters that may be useful to the flight crew.

In another example, lighting module 610 may enable control system 609 to control lights 112 (FIG. 2) and/or 216/218 (FIG. 2, 4, 5, 6) to emit a different pattern, intensity and/or color based on load weight measured on the hook. For instance, if a static or dynamic load exceeds a threshold, the 112 (FIG. 2) and/or 216/218 (FIG. 2, 4, 5, 6) may flash red. On the other hand, if the load is below a weight threshold, the lights 112 (FIG. 2) and/or 216/218 (FIG. 2, 4, 5, 6) may flash green. Alternatively, if the load is approaching maximum weight threshold, the lights 112 (FIG. 2) and/or 216/218 (FIG. 2, 4, 5, 6) may flash yellow.

In another example, lighting module 610 (FIG. 6) may enable control system 609 to change light color, flash, flash frequency, or pattern of 112 (FIG. 2) and/or 216/218 (FIG. 2, 4, 5, 6) when a load is applied (such as green to red), providing visual confirmation to the pilot/hoist operator that the load is indeed transferred.

In another example, lighting module 610 may enable control system 609 to change light color, flash, flash frequency, or pattern of lights 112 (FIG. 2) and/or 216/218 (FIG. 2, 4, 5, 6) based on the positional location of hook 102, as when it is close to the ground, on the ground, or within a certain amount of feet away from the helicopter upon cable retraction.

In another example, lighting module 610 may enable control system 609 to change light color, flash, flash frequency, or pattern of lights 112 (FIG. 2) and/or 216/218 (FIG. 2, 4, 5, 6) based on the load/mass on the hook.

In yet another example, lighting module 610 may enable control system 609 to change light color, flash, flash frequency, or pattern of lights 112 (FIG. 2) and/or 216/218 (FIG. 2, 4, 5, 6) based on detection of a shock load, together with the magnitude of the shock load.

In yet another example, lighting module 610 may enable control system 609 to emit a visible laser illuminator (not shown)) that marks the ground at the approximate location of the hook (when descended) for the purpose of more quickly identifying and maintaining the target hover position for the rescue operation.

In another example, lighting module 610 (FIG. 6) may enable control system 609 (FIG. 6) to cause lights 112 (FIG. 2) emitted from housing 114 (FIG. 2) to control lights 112, such as to emit a spot light, light intensity, covert lighting, and so forth.

Example position/load module 612 facilitates a mode of operation of control system 609 in which position/load module 612 monitors measurements made by an inertial measurement unit (IMU) and/or global positioning unit (GPS) (collectively referred to herein as IMS/GPS 602) located in smart-hook 102 and/or housing 114. Position/load module 612 may also record these measurements (i.e., data) generated by IMS/GPS 602, and transmit these measurements to lighting module 610 as well as other monitoring devices, such as located in helicopter 100.

The IMS/GPS 402 data record by position/load module may also be downloaded after a flight mission for analysis and maintenance diagnostics of the helicopter 100, cable 104, and hook 106.

IMS/GPS 602 in communication with position/load module 612 enables control system 609 to monitor a location and/or relative motion of the hook end in three-dimensional coordinate space relative to the helicopter.

Thus, the combination of load cell 306 FIG. 5), and IMS/GPS 602 under control of control system 609 (including control system 310 individually or in combination with system 609 as a whole) allow for complete mapping of hook 102—and hook load—in 3D coordinate space and relative to the airframe (helicopter and/or hoist). With cable payout information, the hoist cable fleet angle may also be calculated. This data may be used to understand the load conditions on the hoist and helicopter airframe. Put differently, IMS/GPS 602 under control of control system 609 (including control system 310 individually or in combination with system 609 as a whole) allow for mapping of the position, velocity, and acceleration of the hook relative to the ground and/or aircraft.

In addition, IMS/GPS 602 under control of control system 609 (including control system 310 individually or in combination with system 609 as a whole) may use the real-time load and acceleration data from smart-hook 102 to adjust the payout of cable 104 (via hoist equipment such as cable 104, smart-hook 102, and a motor 110) to actively dampen vibrations imparted to the hoist equipment and aircraft.

Thus, this data allows for monitoring health and maintenance of the hoist system, and the number of hoist system cycles, and the ability to predict component wear and plan maintenance. For the helicopter, this data allows for complete dynamic load mapping for the structural design of helicopter hoist mounts/interfaces. Real-time dynamic load information supplied by control system 609 also allows for (future) active hoist mounts (think active suspension systems) that optimize the load transfer and energy management between the hook and the helicopter, providing for reduced shock loads on hoist components, helicopter mounts, and any rescue personnel or cargo on the hook. Optimizing the dynamic response of the helicopter and hoist as a system can provide inputs to helicopter-flight controls for an optimized response during load transfer and flight.

The dynamic response of the system may change based on cable length (i.e., pendulum effect on the cable), and the ability to optimize the helicopter system-level response with these sensor inputs may provide for improved flight control and stability during rescue operations and cargo transfers.

In another aspect, control system 609 may transition the power supplied to system 609 and/or smart hook 102 into a lowest-power-sleep state for battery conservation, and can be awakened to an active state by a sensor input, such as IMU/GPS 602 detecting hook movement (lowering) relative to the IMU on the hoist/airframe, applied load on the hook, or some other sensor input, or manual input via a switch. As appreciated by one skilled in the art after having the benefit of this disclosure, there can be various other waking events, such as (a) a load applied to the hook, (b) a user pressing an on/off button on smart-hook 102, (c) a user pressing a control icon on a tablet or remote control button, (d) a specific vibration profile, (e) an RFID chip activation system, or some other suitable waking event/system.

Position/load module 612 may also facilitate a state of operation for control system 609 in which it tracks and records a profile, such as the duration a load remains on the cable, the date and time of day the hoist event occurred, the position and location of the hoist event, and other suitable parameters such as the temperature of the hoist event.

In another example, position/load module 612 may also record static and dynamic cable loads versus time. And if a load exceeds a static or dynamic threshold (such as a weight limit), control system 609 may send an alert or message. The alert may be displayed locally on smart-hook 102 (such as lights) or remotely on a computer interface or hoist system located in the helicopter or elsewhere.

In another example, position/load module 612 may also monitor via IMU/GPS 602 (or other means such as range detector (not shown)) a distance or length that a cable extends from a rescue hoist, and a height a hook is above ground or water.

In another example, position/load module 612 may also monitor and record the approximate altitude above the ground the hook is positioned. For instance, a laser rangefinder (or other means) implemented as part of lighting 216/218 or resident in helicopter 100 may send data to position/load module indicating the altitude of the hook above the ground.

Example Interface and Display Module

Figure 7:
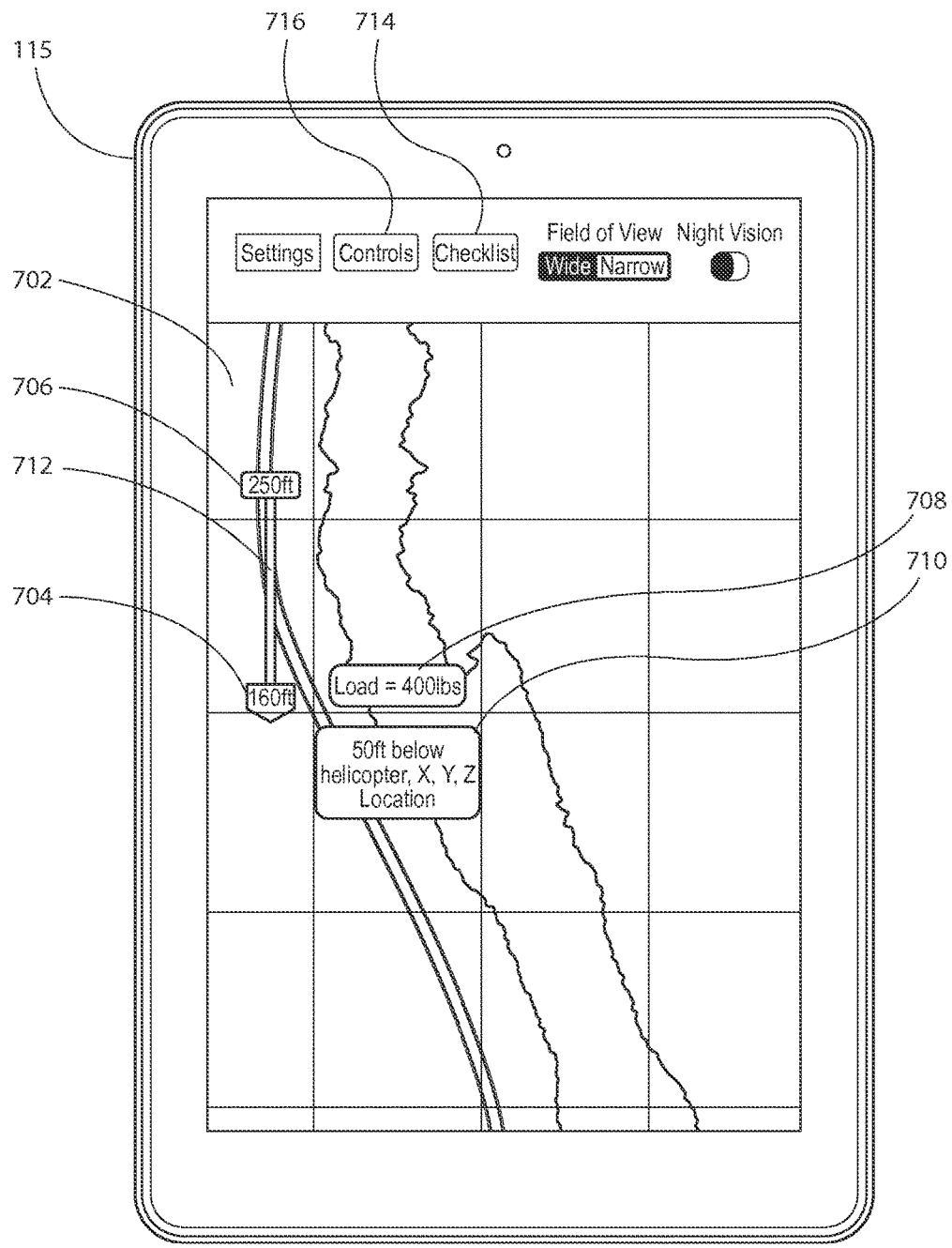
FIG. 7 shows an example video scene and appurtenant virtual markers rendered on the display of a helicopter-hoist system.

FIG. 7 shows an example video scene and appurtenant virtual markers rendered on a display 115 (FIG. 7) of a helicopter-hoist system.

Referring to FIGS. 6 and 7, an example display module 614 (FIG. 6) may cause control system 609 (FIG. 6) to (a) receive the video stream from camera(s) 118 (FIGS. 2 and 6), (b) overlay a virtual marker 704 (FIG. 7) indicating the height of a rescue hook above the ground or water on the video stream in proximity to the hook end, and (c) generate the received video stream combined with overlaid virtual indicators as an image on display 115 (FIG. 7) in real-time.

In another example, display module 614 (FIG. 6) may cause control system 609 (FIG. 6) to (a) receive the video, (b) overlay a virtual marker 706 (FIG. 7) indicating the height of the helicopter relative to ground or water on the video stream in proximity to the helicopter, and (c) display, in real-time, the received video stream combined with overlaid virtual indicators.

In another example, display module 614 (FIG. 6) may cause control system 609 (FIG. 6) to (a) receive the video, (b) overlay a virtual marker 708 (FIG. 7) indicating the load on the cable on the video stream in proximity to the cable; and (c) display, in real-time, the received video stream combined with overlaid virtual indicators.

In yet another example, display module 614 (FIG. 6) may cause control system 609 to use the measured hook location (such as in three-dimensional coordinate space relative to the helicopter) and display this data as a virtual indicator 710 (FIG. 7) in proximity to the hook location indicating the three-dimensional coordinate space.

In another example, display module 614 (FIG. 6) may cause control system 609 to overlay a virtual color over an image of the cable from the received video when the measured load is below a maximum weight limit on the cable. For example, a virtual green line 712 (FIG. 7) may be overlaid on top of a real image of the cable to represent that the load is within an acceptable weight tolerance. A virtual yellow line 712 (FIG. 7) may be overlaid on top of the real image of the cable to represent that the load has exceeded a warning threshold and is approaching the maximum weight. And a virtual red line 712 (FIG. 7) may be overlaid on top of a real image of the cable to represent that the load is exceeds a maximum weight limit on the cable. The overlaid colored-lines 712 (FIG. 7) may be generated on display 115 (FIG. 7) in real-time.

In another example, display module 614 (FIG. 6) may cause control system 609 (FIG. 6) to display rescue checklists 714 (FIG. 7) on display 115 (FIG. 7) if activated by the user.

In another example, display module 614 (FIG. 6) may cause control system 609 to generate on display 115 virtual arrows (see also reference number 704 pointing down) (FIG. 7) on the received video stream indicating a direction of travel of the cable.

Accordingly, display 115 (FIG. 7) provides crew members in helicopter 100 with an improved view and understanding of the mission for improved safety and effectiveness. For instance, pilots may can view what's happening on the ground by looking at display 115 (such as a heads-up display module not shown). Cockpit crew members can also see the status of rescuers (paramedic or swimmer) and victims. Hoist operator actions are visible to all crew members.

Thus, all crew members may quickly and intuitively assess the rescue situation by referring to customizable display 115 (FIG. 7) for critical information at-a-glance. This includes: real-time streaming video; aircraft height above the ground; hook height above the ground; cable payout and direction; cable load; and plumb line of hook. Other essential mission information may be displayed.

Also included on display 115 (FIG. 7) is a control icon 716 (FIG. 7), which may allow control of system 101, such as lighting intensity, width of lighting beams, type of lighting used, scene of the camera, and many other features of system 101.

Example—Illustrative Process

Figure 8:
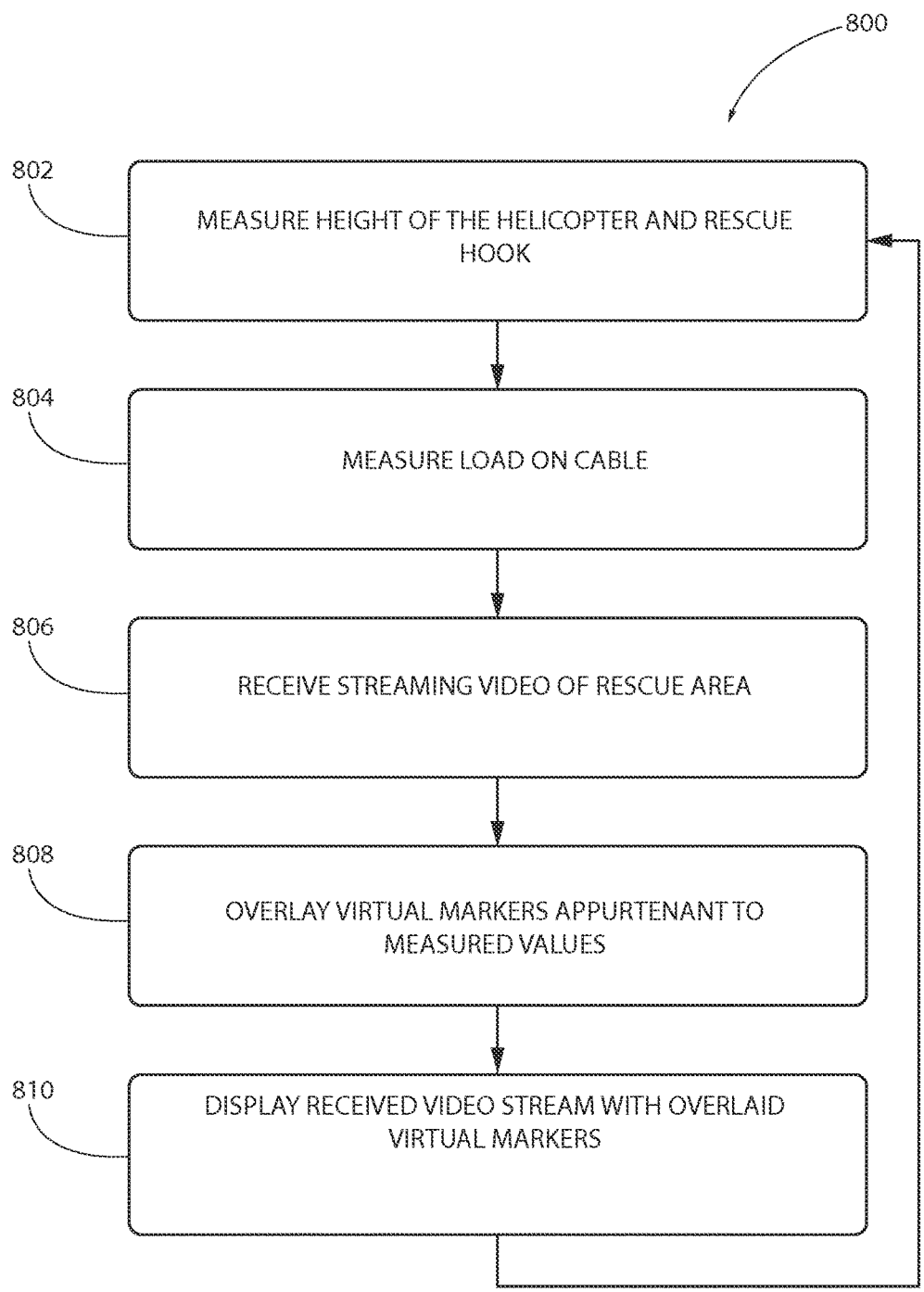
FIG. 8 shows an illustrative process for disseminating helicopter-hoist information on a display device.

FIG. 8 shows an illustrative process 800 for disseminating helicopter-hoist information on a display device. Process 800 may be described with reference to FIGS. 1-7.

Process 800 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Also, one or more of the described blocks may be omitted without departing from the scope of the present disclosure.

At 802, a control system measures a height of the helicopter and rescue hook relative to ground or water. Process 800 proceeds to 804.

At 804, a control system measures a load on the rescue cable and/or hook. Process 800 proceeds to 806.

At 806, a control system receive streaming video of rescue area under the helicopter. Process 800 proceeds to 808.

At 808, a control system overlays virtual markers appurtenant to the measured values obtained from 802 and 804 onto the video stream. Process 800 proceeds to 810.

At 810, a control system displays the video stream with the overlaid virtual markers appurtenant to the measured values obtained from 802 and 804. And process 800 repeats itself in real-time. Again, some are all operations may be performed concurrently or in pipelined manner Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A smart hook apparatus, comprising:
    a housing having a cable end for attachment to a rescue cable, and a hook end for attachment to rescue equipment, the housing further including an outer surface;
    a ring coaxially protruding from the outer surface of the housing and located between the cable end and the hook end, wherein the ring has an upper surface facing the cable end, and a lower surface facing the hook end;
    a first plurality of lights mounted on the upper surface of the ring configured to illuminate and direct light upward and generally toward a helicopter when the hook end is lowered from the helicopter;
    a second plurality of lights mounted on the lower surface of the ring configured to illuminate and direct light downward and generally in a direction away from the helicopter when the hook end is lowered from the helicopter;
    a control system located in the housing configured to measure, store, and transmit at least one of the following parameters:
    (a) a load between the hook end and the cable end;
    (b) an altitude of the housing above the ground or water; and
    (c) at least one of a position and a relative motion of the hook in coordinate space;
    wherein the control system comprises a processor and the control system is further configured to modify at least one of the following:
    an illumination pattern, a flash frequency, and a color of the light emitted from the plurality of lights located with the housing based on at least one of the following:
    the measured load between the hook end and the cable end; and
    the measured altitude of the housing relative to the ground.

2. The smart hook apparatus of claim 1, wherein the control system is further configured to measure and transmit the position of the housing and date of a rescue mission.

3. The smart hook apparatus of claim 1, wherein the control system includes a wireless transmitter.

4. The smart hook apparatus of claim 1, further comprising a load cell configured to measure a load on the cable, wherein the control system is in communication with the load cell.

5. The smart hook apparatus of claim 1, wherein the housing further comprises an inertial navigation system (INS) in communication with the control system, wherein the INS determines and maintains a location of the hook end in coordinate space.

6. The smart hook apparatus of claim 1, further comprising a load cell configured to measure at least one of the following: a shock load and a load abnormality on the cable, wherein the control system is in communication with the load cell.

7. The smart hook apparatus of claim 1, wherein the housing further comprises a power system having an active mode and sleep mode, wherein the power system is configured to transition from the sleep mode to the active mode when the cable is lowered from the helicopter.

8. The smart hook apparatus of claim 1, wherein the housing further comprises an inertial navigation system (INS) and GPS unit in communication with the control system, wherein the GPS unit and INS maintains a location of the hook end in three-dimensional coordinate space relative to the helicopter.

9. The smart hook apparatus of claim 1, wherein the control system measures a duration of time the load remains on the cable.

10. The smart hook apparatus of claim 1, wherein at least one of the first plurality of lights mounted on the upper surface of the ring and the second plurality of lights mounted on the lower surface of the ring comprise an infrared light source.

11. The smart hook apparatus of claim 1, further comprising a range measuring unit configured to determine a distance of the hook from the helicopter.

12. The smart hook apparatus of claim 1, further comprising:
    a cable payout and direction detection unit configured to measure a distance the cable is extended from the helicopter and a direction of movement of the cable; and
    a laser light source configured to emit visible laser light to mark a location on the ground indicative of a location of the hook.

13. The smart hook apparatus of claim 1, wherein the control system is further configured to modify at least one of the following: an illumination pattern, a flash frequency, and a color of the light emitted from the plurality of lights in response to the measured load between the hook end and the cable end exceeding a load threshold.

14. A hoist system comprising the smart hook apparatus of claim 1 and further comprising:
    a cable configured to be attached to the housing at the cable end; and
    a motor configured to raise and lower the cable;
    an aerodynamically-shaped cowling configured to house the motor and at least partially house the cable.

15. The hoist system of claim 14, further comprising an active load control system, the active load control system being configured to receive real-time load and acceleration data from the smart-hook and adjust a payout of the cable to actively dampen vibrations imparted to the hoist system and aircraft.

16. The smart hook apparatus of claim 1,
wherein the control system is further configured to measure and transmit the position of the housing and date of a rescue mission;
wherein the control system includes a wireless transmitter; and
the smart hook apparatus further comprising a load cell configured to measure a load on the cable, wherein the control system is in communication with the load cell.

17. A smart hook apparatus, comprising:
a housing having a cable end for attachment to a rescue cable, and a hook end for attachment to rescue equipment, the housing further including an outer surface;
a ring coaxially protruding from the outer surface of the housing and located between the cable end and the hook end, wherein the ring has an upper surface facing the cable end, and a lower surface facing the hook end;
a first plurality of lights mounted on the upper surface of the ring configured to illuminate and direct light upward and generally toward a helicopter when the hook end is lowered from the helicopter;
a second plurality of lights mounted on the lower surface of the ring configured to illuminate and direct light downward and generally in a direction away from the helicopter when the hook end is lowered from the helicopter;
a control system located in the housing configured to measure, store, and transmit at least a load between the hook end and the cable end;
wherein the control system comprises a processor and the control system is further configured to modify at least one of the following: an illumination pattern, a flash frequency, and a color of the light emitted from the plurality of lights located with the housing based on the measured load between the hook end and the cable end.

18. A smart hook apparatus, comprising:
a housing having a cable end for attachment to a rescue cable, and a hook end for attachment to rescue equipment, the housing further including an outer surface;
a ring coaxially protruding from the outer surface of the housing and located between the cable end and the hook end, wherein the ring has an upper surface facing the cable end, and a lower surface facing the hook end;
a first plurality of lights mounted on the upper surface of the ring configured to illuminate and direct light upward and generally toward a helicopter when the hook end is lowered from the helicopter;
a second plurality of lights mounted on the lower surface of the ring configured to illuminate and direct light downward and generally in a direction away from the helicopter when the hook end is lowered from the helicopter;
a control system located in the housing configured to measure, store, and transmit at least an altitude of the housing above the ground or water
wherein the control system comprises a processor and the control system is further configured to modify at least one of the following: an illumination pattern, a flash frequency, and a color of the light emitted from the plurality of lights located with the housing based on the measured altitude of the housing relative to the ground.

19. The smart hook apparatus of claim 18, further comprising a range measuring unit configured to determine a distance of the hook from the helicopter.

20. The smart hook apparatus of claim 18, further comprising a cable payout and direction detection unit configured to measure a distance the cable is extended from the helicopter and a direction of movement of the cable.

* * * * *